Patented Nov. 10, 1942

2,301,174

UNITED STATES PATENT OFFICE 2,301,174

FLUORESCENT ARTIFICIAL TEETH

Charles Dietz, York, Pa., assignor to The Dentists' Supply Company of New York, New York, N. Y., a corporation of New York No Drawing. Application September 23, 1941
Serial No. 411,992

6 Claims. (Cl. 250—71)

This invention relates to artificial teeth, and has particular reference to artificial teeth which are indistinguishable from natural teeth in ultra-violet light.

The present application is a continuation-in-part of my co-pending application Serial No. 215,879, filed June 25, 1938, entitled, "Fluorescent artificial teeth."

Rays at the lower end of the visible spectrum, known as "violet rays" or "ultra-violet rays" have for some time been utilized not only to produce optical effects, but for other definite purposes among which may be found the use for the destruction of bacteria. In ball rooms and the like, the walls and decorative parts thereof are sometimes adorned with scenery invisible to the eye with the use of ordinary light, but which, when subjected to ultra-violet light, become clearly visible, thereby producing scenic displays and the like by the transfer of regular artificial light to ultra-violet light.

Science has recently recognized the fact that invisible ultra-violet rays kill bacteria; that these rays are harmless to human beings and are inexpensive. There has recently appeared a light, known as "Sterilamp," created in the Westinghouse laboratory at Bloomfield, New Jersey. This light is now installed in the operating room of numerous hospitals, among which is the Mayo Clinic, Rochester, Minnesota, the New York Medical Center, and others, and if amazing results as established there continue, this light or others of the same type will probably soon be used in restaurants, banks, and, in fact, universally for the counteraction of bacteria. An interesting article respecting this light will be found in the June, 1938, number of the Scientific American, page 344, under the subject "Sterilizing with 'Light'."

In the production of artificial teeth, it has been the aim of the manufacturers to produce teeth to simulate natural teeth so closely in shape and coloring as to defy detection. These teeth, heretofore largely manufactured from porcelains and the like, have met with universal satisfaction over a long period of years. However, because of the increasing use of ultra-violet light, it is desirable to make certain changes in artificial teeth.

Natural teeth, when subjected to ultra-violet rays, show a fluorescence, which makes them perfectly visible in a dark room. This is an inherent phenomenon. The present day artificial teeth, on the other hand, lacks this property of fluorescence, and when subjected to ultra-violet rays, these teeth practically disappear, that is to say, they appear black. Consequently, if a person having some natural and some artificial teeth was present in a ball room, or in the operating room of a hospital, or in any other darkened room, and ultra-violet light was then turned on, the natural teeth, showing fluorescence, would appear very definitely with a chalky white appearance, while the artificial teeth would be black or invisible, so that considerable embarrassment would probably be the result.

With the growth of the use of ultra-violet light, this difficulty has become quite marked, and experiments have been conducted to provide artificial teeth with the property of fluorescence, when subjected to ultra-violet light. As a result of these investigations, I have learned that the admixture of certain ingredients with the basic tooth forming material will provide the property of fluorescence to artificial teeth, when subjected to ultra-violet light.

Furthermore, I have found that an artificial tooth having the property of fluorescence under ultra-violet light has a more vital appearance in visible light, and accordingly, more closely simulates a vital natural tooth.

A primary object of the present invention is to provide artificial teeth having the property of fluorescence when subjected to ultra-violet light.

Another object of the invention is to provide artificial teeth which, when subjected to ultra-violet light, will be indistinguishable from natural teeth.

Another object of the invention is to provide artificial teeth which closely simulate a vital natural tooth.

Another object of the invention is to provide a method of manufacturing artificial teeth which are fluorescent in ultra-violet light, and wherein the substance imparting fluorescence will not perceptibly alter the tooth color desired in visible light.

According to the invention, the usual basic tooth forming material has added thereto a substance which renders the artificial teeth fluorescent in ultra-violet light, and the amount of this substance, which is added, is so controlled that it does not perceptibly change the tooth color when the tooth is viewed in ordinary light.

Artificial teeth have for many years been made from porcelain, and I have learned, from experiment, that the admixture of uranium in a suitable form, such as uranium oxide, with the porcelain, will provide the finished teeth with the property of fluorescence, rendering the teeth indistinguishable from a natural tooth, under the influence of ultra-violet light.

I am aware that the fluorescent properties of certain uranium compounds has been previously known. Also, I am aware that it has been previously proposed to employ uranium compounds as a coloring material in artificial teeth. However, so far as I am aware it has not been previously known that uranium compounds could be employed in the manufacture of artificial teeth in sufficiently small amounts to have no perceptible coloring effect on the teeth, and at the same time the amount of uranium used would be sufficient to impart a desired degree of fluorescence to the teeth.

It has been common practice in the manufacture of artificial teeth to employ high fusing metallic oxides as a coloring agent. Due to the fact that various color shades are desired, and, further, due to the fact that the amount of coloring material used varies with the opacity of the teeth it has been necessary to develop a considerable number of formulae. These formulae for imparting color have been carefully worked over a considerable period of years. Therefore, it is highly desirable that these developed formulae be used, and I found that the uranium content could be controlled so as to produce no perceptible effect on the tooth color, and still impart a desired degree of fluorescence to the teeth. For example, uranium salts will produce red yellow colors in low fusing porcelains and will produce a greenish color in porcelains having fusing points ranging from 2000° F. to 2500° F. This greenish color is very undesirable in attempting to match natural tooth shades.

The uranium content required to maintain a standard fluorescence varies in accordance with the tooth color desired, and the opacity of the basic tooth forming material. For example, as the amount of titanium oxide employed to provide a yellow color is increased the uranium content must be increased in order to maintain a desired fluorescence. As a specific example, I have found that yellow colored porcelain, as contrasted with uncolored basic porcelain, requires approximately five times the uranium content.

The opacity of the tooth material also determines the amount of uranium necessary to maintain a given standard of fluorescence, and the uranium content must be increased for materials of greater opacity. This is of particular importance in achieving substantially the same degree of fluorescence in body forming tooth material, and the relatively translucent enamel, so that the fluorescence of the basic material will not have a diminishing effect on the fluorescence of the enamel.

The manner of adding the uranium will now be described. The uranium may be added either as a ground frit of $UO_2$ in feldspar or as a mixture of sodium uranate ($NA_2U_2O_7$) and feldspar. The uranium may be introduced in any suitable form, such as an oxide or salt, and as a specific example, I add one-half percent by weight of uranium to 99½ percent by weight of feldspar, and grind this mixture for a period, such as twenty-four hours. The mixture is then fritted, and again ground for a period, such as fifty hours. I have found that the time of grinding, particularly before fritting, has a marked effect as to fluorescence. For example, with five hours grinding, the fluorescence was very poor relative to material which had been ground fifty hours. The material prepared as described and containing uranium is then mixed with the basic tooth forming material having the usual ingredients in desired proportions. The uranium content is predetermined in accordance with the color characteristics, opacity, and the like desired in the finished tooth.

The uranium content may vary from .009% to .032% in the enamels and from .01% to .044% in the body material without having any perceptible effect on the color of the tooth, and at the same time provide a desired degree of fluorescence. An exceptionally dark shade of color may require a uranium content greater than the maximum cited, but for the darkest practical shade the uranium content will not exceed .10%.

Many experiments, some successful, have been conducted to provide artificial teeth from synthetic resins, Celluloid, Bakelite, and the like, and this invention contemplates the admixture, with the basic ingredients, for forming teeth, other than porcelain teeth, of an ingredient or ingredients for rendering such teeth fluorescent, under the influence of ultra-violet light.

The invention, therefore, broadly comprises artificial teeth having the property of fluorescence and indistinguishable from natural teeth in ultra-violet light. In the formation of teeth from synthetic resin, Celluloid and the like, wherein the basic ingredient will not require fusion, fluorescence may be incorporated by the use of certain organic substances, such as mineral waxes, fats, and/or other materials.

Although I have described a preferred method of practicing my invention I contemplate that numerous and extensive departures may be made therefrom without departing from the spirit of my invention and the scope of the appended claims.

The invention is hereby claimed as follows:

1. A porcelain artificial tooth having a fluorescence comparable to the fluorescence of natural teeth when viewed in ultra-violet light, said tooth comprising a vitreous body portion and a relatively transparent vitreous enamel portion, both the body portion and enamel portion having uranium incorporated therein to impart fluorescence, the uranium content of the body portion exceeding the uranium content of the enamel portion, and the uranium content of the body portion varying from .01% to .1% and the uranium content of the enamel portion varying from .009% to .032%.

2. A porcelain artificial tooth having a fluorescence comparable to the fluorescence of natural teeth when viewed in ultra-violet light, said tooth comprising a body portion and a relatively transparent enamel portion, both the body portion and enamel portion having uranium therein to impart fluorescence, the uranium content of the body portion exceeding the uranium content of the enamel portion, and the uranium content of the body portion varying from .01% to .1% by weight.

3. A porcelain artificial tooth having a fluorescence comparable to the fluorescence of natural teeth when viewed in ultra-violet light, said tooth comprising a body portion and a relatively transparent enamel portion, both the body portion and enamel portion having uranium therein to impart fluorescence, the uranium content of the body portion exceeding the uranium content of the enamel portion, and the uranium content of the enamel portion varying from .009% to .032% by weight.

4. A porcelain artificial tooth having a fluorescence comparable to the fluorescence of natural teeth when viewed in ultra-violet light, said tooth comprising a body portion and a relatively transparent enamel portion, both the body portion and enamel portion having uranium therein to impart fluorescence, the uranium content of the body portion exceeding the uranium content of the enamel portion, and the uranium content of the body portion being one-tenth of one percent or less by weight and insufficient to perceptibly influence predetermined color characteristics of the tooth when viewed in visible light.

5. A porcelain artificial tooth having a fluorescence comparable to the fluorescence of natural teeth when viewed in ultra-violet light, said tooth comprising a body portion and a relatively transparent enamel portion, both the body portion and enamel portion having uranium therein to impart fluorescence, the uranium content of the body portion exceeding the uranium content of the enamel portion, and the uranium content of the enamel portion being thirty-two thousandths of one percent or less by weight and insufficient to perceptibly influence predetermined color characteristics of the tooth when viewed in visible light.

6. The method of making porcelain teeth of the type comprising a relatively opaque body portion and a relatively translucent enamel portion and having a fluorescence comparable with natural teeth when subjected to ultra-violet light, said method comprising the steps of mixing feldspar with a uranium compound, grinding said mixture, then fritting the mixture, then grinding the fritted mixture, then mixing the ground frit with ceramic body forming material in the proportion of one-tenth of one percent or less uranium by weight, mixing additional ground frit with ceramic enamel forming material in the proportion of thirty-two thousandths of one percent or less uranium by weight, then molding the body material and enamel material to tooth form, and then firing same.

CHARLES DIETZ.